(12) United States Patent
Blenke et al.

(10) Patent No.: US 12,345,010 B2
(45) Date of Patent: *Jul. 1, 2025

(54) LINING TUBE FOR RESTORING DEFECTIVE SEWER SHAFTS AND METHOD FOR PRODUCING AND INSTALLING SUCH A TUBE

(71) Applicant: BRANDENBURGER LINER GMBH & CO. KG, Landau (DE)

(72) Inventors: Stefan Blenke, Landau (DE); Milan Ebeling, Landau (DE)

(73) Assignee: Brandenburger Liner GmbH & Co. KG, Landau (DE)

( * ) Notice: Subject to any disclaimer, the term of this patent is extended or adjusted under 35 U.S.C. 154(b) by 155 days.

This patent is subject to a terminal disclaimer.

(21) Appl. No.: 18/257,649

(22) PCT Filed: Oct. 26, 2021

(86) PCT No.: PCT/EP2021/079672
§ 371 (c)(1),
(2) Date: Jun. 15, 2023

(87) PCT Pub. No.: WO2022/128217
PCT Pub. Date: Jun. 23, 2022

(65) Prior Publication Data
US 2024/0117587 A1 Apr. 11, 2024

(30) Foreign Application Priority Data
Dec. 18, 2020 (DE) .................... 10 2020 134 224.1

(51) Int. Cl.
*E02D 29/12* (2006.01)
*F16L 55/165* (2006.01)

(52) U.S. Cl.
CPC ........ *E02D 29/128* (2013.01); *F16L 55/1652* (2013.01); *F16L 55/1656* (2013.01)

(58) Field of Classification Search
CPC ... F16L 55/1654; F16L 55/163; F16L 55/165; F16L 55/1656; E02D 29/128; E03F 2003/065
See application file for complete search history.

(56) References Cited

U.S. PATENT DOCUMENTS

| | | |
|---|---|---|
| 5,106,440 A | 4/1992 | Tangeman |
| 5,798,013 A | 8/1998 | Brandenburger |

(Continued)

FOREIGN PATENT DOCUMENTS

| | | |
|---|---|---|
| DE | 102011103001 A1 | 11/2012 |
| EP | 0787940 A1 | 8/1997 |

(Continued)

*Primary Examiner* — Benjamin F Fiorello
(74) *Attorney, Agent, or Firm* — Laurence A. Greenberg; Werner H. Stemer; Ralph E. Locher (57) ABSTRACT

A lining tube for restoring a defective sewer shaft which has a first shaft portion of a first diameter and an adjoining second shaft portion of an larger diameter. The lining tube has inner film tube and a radially expandable layer of fibrous material around the inner film tube and impregnated with a curable reactive resin. The inner film tube has a connecting portion which extends in the longitudinal direction and which connects two mutually parallel circumferential portions of the inner film tube to a circumferentially closed inner film tube. The connecting portion has a predetermined breaking point which extends along the inner film tube and can be separated in the circumferential direction by introducing a pressure medium into the inner film tube, in order to radially expand the inner film tube and the layer of fibrous material beyond their nominal diameter.

16 Claims, 8 Drawing Sheets

(56) References Cited

U.S. PATENT DOCUMENTS

| | | | |
|---|---|---|---|
| 8,821,068 B2* | 9/2014 | Kiest, Jr. | E02D 29/12 |
| | | | 264/269 |
| 9,334,998 B2 | 5/2016 | Duttenhoefer | |
| 9,709,206 B2* | 7/2017 | Duttenhoefer | B32B 3/18 |
| 10,202,736 B1* | 2/2019 | Plummer | B32B 5/022 |
| 11,708,930 B2* | 7/2023 | Smit | E02D 29/128 |
| | | | 138/98 |
| 2006/0151042 A1 | 7/2006 | Stringfellow et al. | |
| 2010/0012214 A1* | 1/2010 | Kamiyama | F16L 55/1656 |
| | | | 405/184.2 |
| 2015/0023735 A1 | 1/2015 | Eschenbrenner et al. | |
| 2016/0305579 A1 | 10/2016 | Graham | |
| 2019/0360628 A1* | 11/2019 | Corneil | F22B 1/285 |

FOREIGN PATENT DOCUMENTS

| | | |
|---|---|---|
| WO | 9504646 A1 | 2/1995 |
| WO | 2012159702 A1 | 11/2012 |
| WO | 2013139892 A2 | 9/2013 |

\* cited by examiner

LINING TUBE FOR RESTORING DEFECTIVE SEWER SHAFTS AND METHOD FOR PRODUCING AND INSTALLING SUCH A TUBE

FIELD AND BACKGROUND OF THE INVENTION

The invention relates to a lining tube for restoring defective sewer shafts which have a first shaft section of a first diameter and, adjoining it, a second shaft section of a widened diameter, and to a method for producing and installing such a tube. The lining tube has an inner film tube and, arranged around it, a radially expandable layer of fiber material, which is impregnated with a curable reactive resin.

In the field of the trenchless restoration of defective pipelines, such as for example defective sewers, use is increasingly being made of lining tubes, which comprise one or more layers of a glassfiber laminate which is impregnated with a liquid reactive resin and is arranged around an inner film tube in the form of overlappingly wound or laid fiber strips. On the outer side, the laminate is surrounded by an outer film tube, which prevents harmful substances, in particular styrene, escaping from the reactive resin into the ground. The lining tubes, which are also referred to as inliners, are drawn into a sewer to be restored, after being drawn in are closed at their ends with the aid of packers and expanded by means of compressed air and cured by light of a UV radiation source, or alternatively by introducing hot steam.

An aforementioned lining tube and a method for producing such a tube are known for example from WO-A 95/04646.

In order when expanding the lining tubes to obtain best possible contact of the same lying against the inner walls of the sewer, which represents the basic prerequisite for a high maximum mechanical load-bearing capacity, they are usually produced with an outer diameter that is 5 to 10% smaller than the inner diameter DN of the sewer pipe to be restored. This slight undersize leads to an improved surface quality of the cured laminate as a result of the additional stretching of the lining tube during the expansion, and allows slight changes in the diameter of a sewer pipe to be compensated. By contrast, stretchability of more than 10% is not possible in the case of the known lining tubes of the prior art, such as for example those of WO-A 95/04646, since it causes the risk of the sensitive transparent inner film being overstretched and damaged, so that the compressed air introduced during the expansion escapes through the damaged inner film into the laminate and blows out the liquid reactive resin at the corresponding point. This generally has the effect after curing of the reactive resin of resulting in a point of mechanical weakness and leakage which can only be determined and eliminated with great effort, if at all.

On the other hand, however, it is likewise not possible in practice to produce the previously described lining tubes with a diameter which is greater than the inner diameter of the sewer pipe to be restored, since the laminate and the outer film tube in this case develop creases, which are undesired in the restored sewer and lead to shadowing when curing by means of UV light, which in the case of greater wall thicknesses prevents complete curing through of the reactive resin.

For the aforementioned reasons, when restoring pipelines with a diameter DN of between 150 mm and 1000 mm, more than 40 different basic types of lining tubes with a respective nominal diameter DN and an inner film tube specially produced in each case are required in order to provide for each sewer diameter an optimally adapted lining tube, which after drawing in, expanding and curing guarantees maximum mechanical strength and seal-tightness. It goes without saying that keeping a corresponding number of generally seamless inner film tubes, and also individually producing the laminate with a corresponding diameter on this basis, represents a great logistical effort that makes the production of the lining tubes expensive.

It can be seen as a further shortcoming of the known lining tubes that sewer pipes in which the inner diameter changes abruptly at a so-called mount, for example from DN 300 to DN 400, can only be lined with the previously described known lining tubes with great uncertainties, or with great effort, by drawing in and connecting two separate lining tubes of a corresponding diameter.

Sewer shafts have to be restored in the same way as pipelines. It makes sense to use the same methods for this. However, sewer shafts have the special feature compared with pipelines, like drain pipes, that they run vertically and are not constant in their diameter. Sewer shafts, or generally shaft structures, usually have a shorter upper section, which extends from the upper shaft opening downward in the vertical direction, an adjoining conical transitional section and, adjoining the conical transitional section, a longer lower, usually cylindrical section of a large diameter, which extends down to the bottom of the shaft. The lower cylindrical shaft section has for example a diameter of 1000 mm, which narrows over the conical transitional section to a diameter of for example 600 mm in the region of the upper opening. Since sewer shafts, or generally shaft structures, do not have to comply with standards, there are many different embodiments, which differ in their length, their diameter and conical shape.

The same technique as is also used for the restoration of the previously described pipelines and sewers has also long been used for the restoration of sewer shafts. Although the vertical alignment of the sewer shafts is less problematic for the use of a previously described lining tube for pipelines, during installation there is the difficulty that the change in diameter between the upper section of the sewer and the lower section is very great and cannot be covered by conventional liners, which allow maximum stretching of up to 10% of the base diameter without the risk of the sensitive inner film tube and also the glassfiber strip winding overstretching and being damaged in this way.

It is known in this connection from WO 2013/139892 A1 to wind lining tubes for restoring sewer shafts onto a winding mandrel with a finite length, which is a positive form of the shaft structure with a conical transitional section. Although the lining tubes produced in this way allow restoration of sewer shafts with comparatively large changes in diameter of over 50%, they have the shortcoming that an individual winding mandrel has to be produced for each embodiment, which increases the production costs extremely.

SUMMARY OF THE INVENTION

It is accordingly an object of the present invention to provide a lining tube which makes it possible to use one and the same lining tube for restoring sewer shafts of different inner diameters.

This object is achieved according to the invention by a lining tube as claimed.

A further object of the invention is to provide a method by which such a lining tube can be produced.

This object is achieved according to the invention by a method as claimed.

Yet a further object of the invention is to provide a method by which such a lining tube can be installed in a defective sewer shaft.

This object is achieved according to the invention by a further method as claimed.

Further features of the invention are described in the subclaims.

According to the concept on which the invention is based, a cross-sectionally circular, cylindrical lining tube is designed such that it can adapt itself to the different diameters of a sewer shaft during the expansion. This makes it possible to produce the lining tube as described in WO-A 95/04646 as an endless tube, so that it can be divided up by the user in situ on the construction site into several individual part-tubes, each of a length corresponding to the depth of the sewer shaft to be restored.

In the same way as a lining tube for restoring conventional horizontally running sewers and pipelines, for this purpose the lining tube comprises an inner film tube on which there is arranged at least one layer of a helically wound or alternatively also circumferentially laid fiber strip, in particular a glassfiber strip or glassfiber nonwoven, which is impregnated with a liquid reactive resin that can be cured by UV light. This is preferably followed by a glassfiber strip oriented in the longitudinal direction (longitudinal tension strip), which removes the tensile forces during the installation of the lining tube, also referred to hereinafter as the "liner", into a sewer shaft.

Preferably arranged around the circumferentially closed layer formed by the resin-impregnated fiber strip is an outer film tube, which may have a nonwoven layer facing the layer of fiber material and laminated onto a plastic film used for forming the outer film tube. Preferably arranged around the outer film tube, which is preferably produced from a multilayer film with a styrene barrier, in particular a PE-PA-PE film, on the inner PE layer of which the nonwoven layer is laminated by a melting operation, is a tear-resistant, preferably fabric-reinforced protective film, which has a structure and material properties similar to a truck tarpaulin or a tear-resistant packaging film, and the longitudinal edges of which are connected for example by adhesive tape or a welded-on or adhesively attached elastic film portion over the length of the lining tube. This elastic film portion, which may also be formed by a strip of adhesive tape of a corresponding width, is broken open during the expansion of the lining tube in the manner of a predetermined breaking point, and thereby allows radial stretching of the otherwise tear-resistant and almost unstretchable outer protective tube to the respective inner diameter of the sewer shaft. The predetermined breaking point may however be incorporated in some other form, for example as a perforation, in the protective tube formed in an overlapping manner from one, two or more film webs by adhesive bonding or welding at the edges, which is also referred to hereinafter as the further outer film tube.

The lining tube is distinguished by the fact that the inner film tube has a connecting portion, which extends in the longitudinal direction of the same and connects two circumferential portions of the inner film tube running parallel to one another to form a circumferentially closed inner film tube of a defined nominal diameter DN, which preferably corresponds to the diameter of the upper, first shaft section. According to the invention, the connecting portion comprises a predetermined breaking point, which extends along the inner film tube and can be broken open in the circumferential direction by introducing a pressure medium, in particular compressed air, so that the inner film tube and the layer of fiber material arranged on it can expand radially beyond the nominal diameter of the unopened inner film tube, which corresponds substantially to the diameter of the first, upper smaller shaft section, by more than 10%, preferably more than 30%, up to the greater diameter of the second, lower shaft section. This provides the advantage that the circumferentially closed inner film tube with the unopened predetermined breaking point can serve in the production of the lining tube on a winding machine as a base tube, around which fiber strips are wound, and which has a well-defined nominal diameter DN and protects the winding tongue or the winding mandrel of the winding machine from direct contact with the resin-impregnated fiber material.

This inner film tube allows great laminate stretching, and is consequently the first layer around which the layer of fiber material is endlessly wound in a known way over an inner winding mandrel in the preferred embodiment. Thus, the lining tube is conventionally produced, packaged and delivered to the construction site.

As a difference from a known wound lining tube that is used for restoring horizontally running sewers and pipelines of a substantially constant diameter, the lining tube according to the invention according to a preferred embodiment is distinguished by the fact that the layer of fiber material arranged in the form of a tube around the inner film tube is formed from an overlappingly wound fiber strip, which allows much greater longitudinal stretching in comparison with fiber strips that are used in the case of conventional lining tubes. This increased longitudinal stretching, which when considered in the longitudinal direction may be at least 10%, preferably however more than 30% or even 50%, with respect to the length of the unstretched fiber strip, makes it possible that the glassfiber strips of the wound fiber layer can stretch more in the radial direction, so that the layer of fiber material can widen its diameter in the radial direction to the respective diameter of the second shaft section, in order to come to lie against the inner wall of the widened shaft section.

To produce such a glassfiber strip with great longitudinal stretching is known in the prior art. When winding or laying the resin-impregnated fiber strips of the lining tube according to the invention, it is accordingly taken into consideration that, as a result of the great radial stretching, the wall thickness of the laminate is correspondingly reduced, so that the material thickness of the fiber strips wound helically one over the other is increased by a corresponding amount in order to produce the layer of fiber material with a corresponding oversize, which ensures the required strength in the finished product after the stretching and curing.

The great stretchability of the fiber strip or strips used in the layer of fiber material is also of advantage in the case of lining tubes according to the invention in which the layer of fiber material is not wound but is laid as a mat in an overlapping manner around the inner film tube with the predetermined breaking point formed on it.

As also recognized by the applicant, when using an outer film tube, it too must correspondingly stretch radially more than in the case of a conventional lining tube. This can be achieved either by generally more stretchable films or an intended expansion joint, as is described for example in the German patent application (DE 10 2011 103 001 A1). Alternatively, when the outer film tube is welded to form a tube after the fiber strips have been wound/laid and the longitudinal tension strip comprising two flat films has been applied, there is the possibility of making it generally somewhat wider, i.e. with a greater diameter, which exceeds the diameter of the first sewer section of a small inner diameter. For this purpose, for example, the flat film from which this tube is thermally welded may be chosen to be so wide that its flat width corresponds in total to the diameter of the second shaft section with the increased inner diameter. In order that this outer film tube welded with an additional oversize, of for example 50%, can be easily handled during transport to the construction site and during drawing into a sewer shaft, the flat films are preferably folded longitudinally and releasably fixed to one another by adhesive tape.

In order to ensure that the tubular inner film of the inner film tube around which the fiber material (laminate) is wound or laid remains airtight during the entire expansion process, in which the inner film tube and the layer of fiber material arranged on it are stretched to the desired diameter in the sewer shaft by means of introduced compressed air, and also during the subsequent curing with UV light, according to the invention a further inner film tube is arranged in the interior space of the inner film tube. This further inner film tube may for example also have been drawn into the inner film tube already from the outset during the production of the lining tube when the latter is produced on a winding mandrel, as described in the aforementioned WO-A 95/04646. Preferably, it is only on the construction site that the further inner film tube is inserted into the lining tube, which in the case of lining tubes for lining sewer shafts is possible with little effort on account of the comparatively small lengths of only up to 6 m.

On the construction site, the lining tube according to the invention is made up to its required length in the specific instance with the inner film tube having the predetermined breaking point, and after that the further inner film tube, which preferably consists of the same film as the inner film tube, is inserted into the lining tube.

For this purpose, the further inner film tube, the diameter of which corresponds at least to the increased diameter of the second shaft section, is closed at its one end by a knot or cable tie, so as to create a film bag, which is preferably about 10-20% longer than the made-up piece of the lining tube that is to be inserted into the sewer shaft.

The lining tube made up to the desired shaft depth is then closed at its one end with a known packer and let down into the shaft structure by means of a crane, until the second, open end is resting on the so-called berm, i.e. the transition between the cylindrical part of the sewer shaft and the so-called flume. After that, the second inner film tube is inserted into the lining tube through the packer from above, and a UV light source is suspended into it from above.

After that, the lining tube with the inserted further inner film tube (air bag), which has a much greater diameter than the first shaft section, or the not broken-open inner film tube, is closed by means of the packer, and the interior space of the air bag is subjected to compressed air by means of an external compressed air source. In this way, the further inner film tube is expanded, and comes to lie initially against the adhesively attached inner film tube that has the predetermined breaking point and the diameter of which corresponds substantially to the diameter of the first, smaller shaft section.

If the pressure is increased further, the adhesive bond/weld seam (predetermined breaking point) of the inner film tube tears, so that from then on it no longer offers any resistance to further stretching. This makes it possible that the layer of fiber material, which has a diameter that corresponds substantially to the diameter of the first, upper (smaller) shaft section, can radially stretch further.

Since the diameter of the further inner film tube is equal to, or preferably slightly greater than, the diameter of the cylindrical lower section of the sewer shaft, the further inner film tube does not undergo stretching in the upper, first shaft section or in the lower, second shaft section, so that in the first shaft section this further inner film tube (air bag) can come to lie in a stress-free manner against the inner wall of the inner film tube, closed along the predetermined breaking point, and in the second, enlarged shaft section and also in the conical transitional section connecting the two shaft sections can come to lie in a stress-free manner against the inner wall of the layer of fiber material—after the breaking open of the predetermined breaking point of the inner film tube. This advantageously ensures that the further inner film tube altogether remains airtight and, in spite of the opened predetermined breaking point in the inner film tube, no compressed air can escape through the layer of resin-impregnated fiber material, which would result in reactive resin being blown out.

As the applicant has recognized, the further inner film tube is absolutely necessary when restoring sewer shafts, since, by contrast with conventional lining tubes for restoring horizontally running sewers and pipelines, a second packer for closing the lining tube cannot be used in the lower shaft section. The reason for this is that the shaft is to be lined at least as far down as the lower end of the cylindrical part, and as far as possible even beyond that into the berm.

The invention is described below with reference to the drawings on the basis of preferred embodiments.

DETAILED DESCRIPTION OF THE INVENTION

Figure 1:
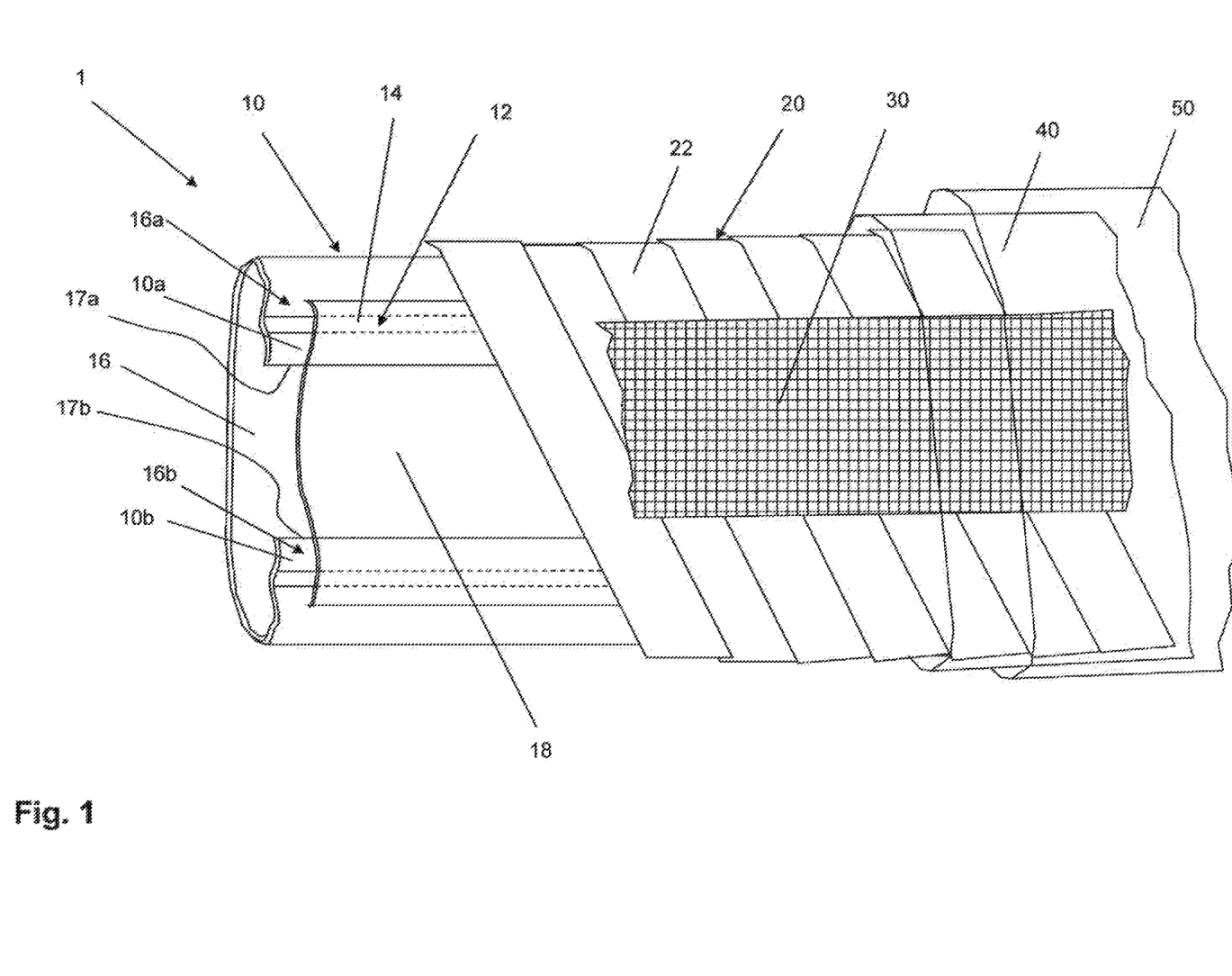
FIG. 1 shows a schematic, partly transparent plan view of a lining tube according to the invention.
Figure 2A:
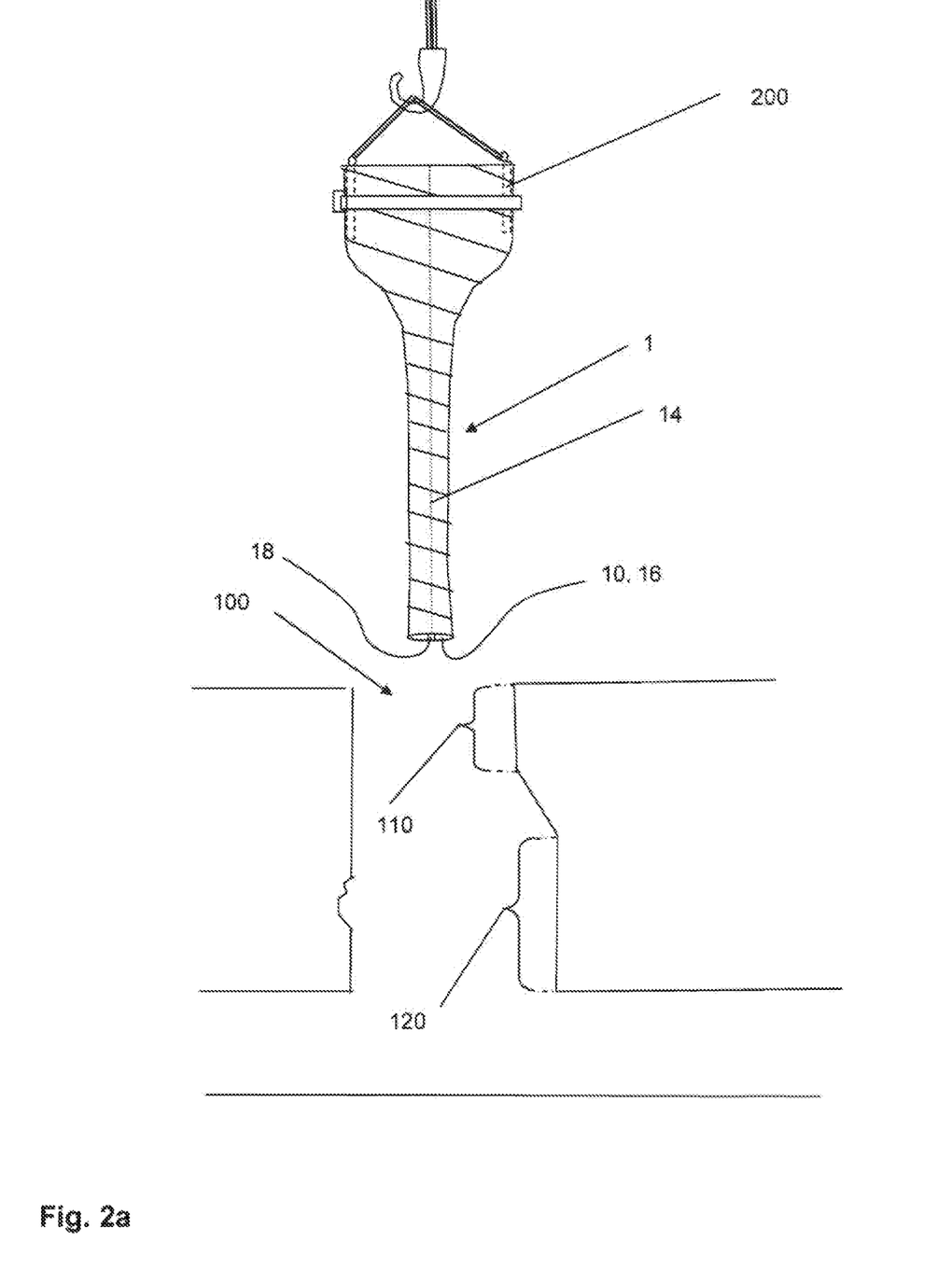
FIG. 2a shows a schematic representation of a sewer shaft to be restored before the insertion of a lining tube according to the invention.

As the representation of FIG. 1 shows, a lining tube 1 for restoring a defective sewer shaft 100, which is represented in FIG. 2a and has a first shaft section 110 of a first diameter and, adjoining it, a second shaft section 120 of a widened diameter, comprises an inner film tube 10 and also, arranged around it, a radially expandable layer of fiber material 20, which is impregnated with a curable reactive resin.

The lining tube is distinguished by the fact that the inner film tube 10 has a connecting portion 12, which extends in the longitudinal direction of the same and connects two circumferential portions 10a, 10b of the inner film tube 10 running parallel to one another to form a circumferentially closed inner film tube of a defined nominal diameter DN. The connecting portion 12 comprises a predetermined breaking point 14, which extends along the inner film tube 10 and can be broken open in the circumferential direction by introducing into the inner film tube 10 a pressure medium, in particular compressed air, from a compressed gas source 6 (FIG. 2e), so that the inner film tube 10 and the layer of fiber material 20 arranged on it can expand radially beyond the nominal diameter, which corresponds substantially to the diameter of the first, upper smaller shaft section 110 (FIG. 2a) by more than 10%, preferably more than 30% and particularly preferably up to 50%, to the widened diameter of the second, lower shaft section 120. Thus, in practice, in the case of a usual sewer shaft 100 with a shaft depth of 2 to 5 m, the smaller diameter of the upper shaft section 110 may be, for example, mm, and the diameter of the lower, cylindrical second shaft section 120 may be, for example, 1000 mm, with a conical transitional section being formed between the first and second shaft sections 110, 120.

In the case of the preferred embodiment of the invention, used for forming the inner film tube 10 is at least one transparent flat film 16, which is formed into a tube, for example by laying, and the longitudinal edges 17a, 17b of which, as shown in FIG. 1, run at a distance from one another and are connected to one another by a transparent film strip 18 adhesively attached or thermally welded onto the outer side. In the case of this embodiment shown in FIG. 1, which can be produced very inexpensively, the predetermined breaking point 14 extends along one or both longitudinal weld seams, or adhesive points, along which the transparent film strip 18 is connected to the corresponding circumferential portions 10a, 10b of the likewise transparent flat film 16 from which the inner film tube 10 is formed.

Figure 3:
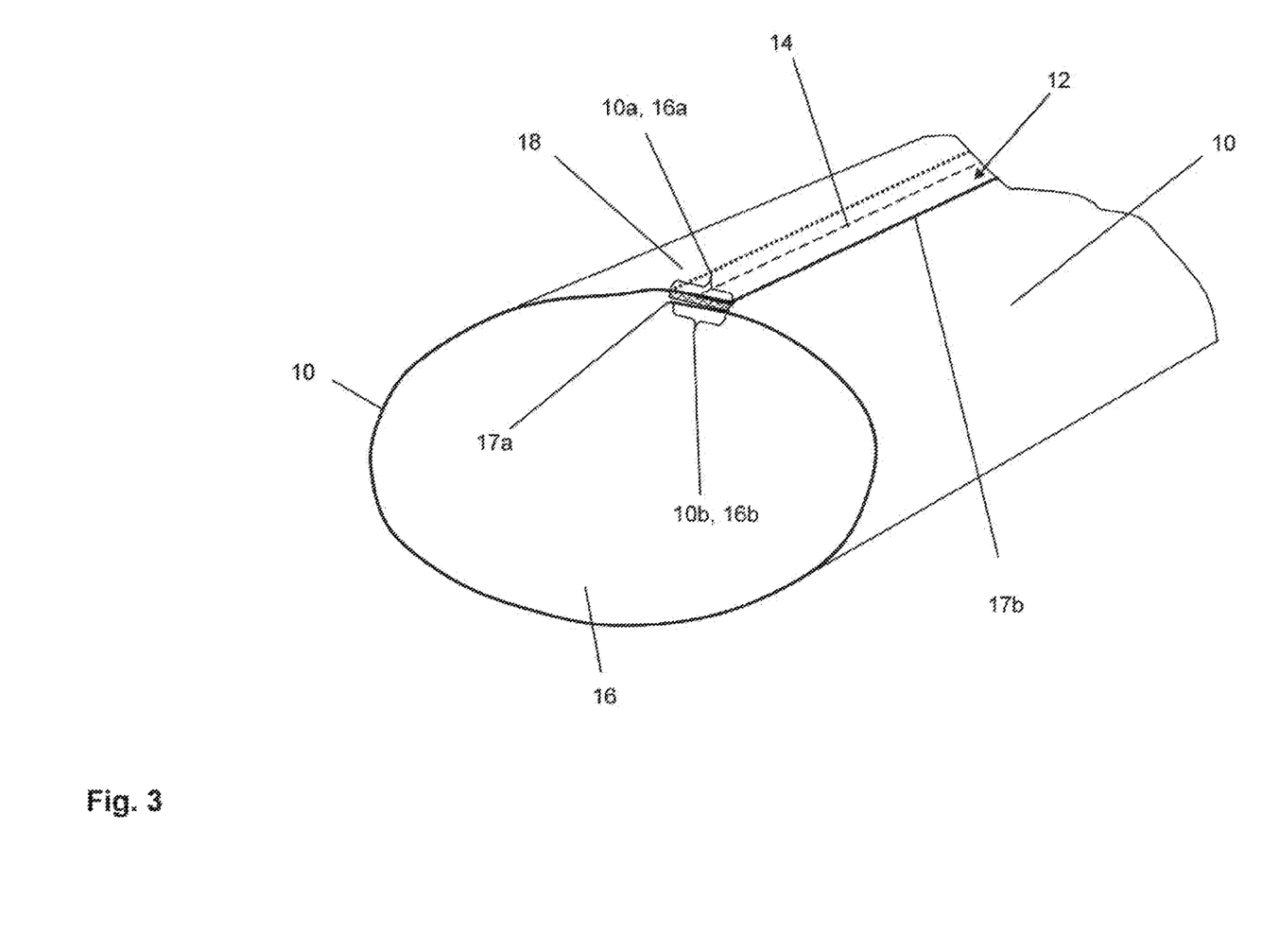
FIG. 3 shows a schematic partial representation of a preferred embodiment of an inner film tube with a predetermined breaking point that is used in the lining tubes according to the invention.

In the case of a further embodiment of the invention, which is shown in FIG. 3 and can be produced particularly inexpensively and easily, the inner film tube 10 comprises at least one flat film 16, which is formed into a tube and the edge portions 16a, 16b of which are guided such that they are overlapping one another and are connected to one another, for example by an adhesive that is only schematically indicated in FIG. 3, for example by a double-sided adhesive tape, or by thermal welding. Alternatively, the edge portions 16a and 16b may also be connected to one another by a transparent adhesive tape. The previously described two embodiments of the inner film tube according to the invention offer the advantage that a further, circumferentially closed, preferably seamless inner film tube, which is for example provided as inexpensive endless material from a roll, can be laid into it before the two circumferential portions 10a, 10b are adhesively bonded or welded to one another. In the case of this embodiment, the resin-impregnated fiber strips of the layer of fiber material are particularly advantageously laid in an overlapping manner around the adhesively bonded/welded inner film tube. The fiber strips are in this case formed as individual mats, which are of a length which corresponds to the length of the lining tube to be produced. In the case of this embodiment, the width of the mats is slightly, for example 10%, greater than the inner circumference of the second, enlarged shaft section 120, whereby it is ensured that the layer of fiber material can expand to the second, greater diameter by circumferential displacement of the longitudinal edges of the mat guided in an overlapping manner, but at the same time always remains completely closed circumferentially when the layer of fiber material has come to lie against the second shaft section of greater diameter.

In order in the case of the previously described embodiments of the inner film tube 10, produced by overlapping adhesive bonding/welding of a flat film 16, to prevent any escape of compressed air through the sometimes not completely closed seams, or through the opened predetermined breaking point 14 in the region of the second shaft section 120 of increased diameter, arranged inside the welded/adhesively bonded inner film tube 10 is a further inner film tube 60 of an airtight transparent plastics material, the one end of which can be closed in an airtight manner by welding or by a sealing element 62, in particular a cord wound around the outer side of the further inner film tube 60, or a cable tie, to form an air bag 64 that is closed on one side. Although the further inner film tube 60 may already be placed into the inner film tube 10 at the factory during production, it is preferably only on the construction site that it is pushed into the interior space of the inner film tube 10, in particular after the insertion of the lining tube 1 into the vertical sewer shaft 100, the lower free end of the further inner film tube 60 having previously been closed in an airtight manner by welding or by a sealing element 62 to form the air bag 64 that is closed on one side.

Figure 4:
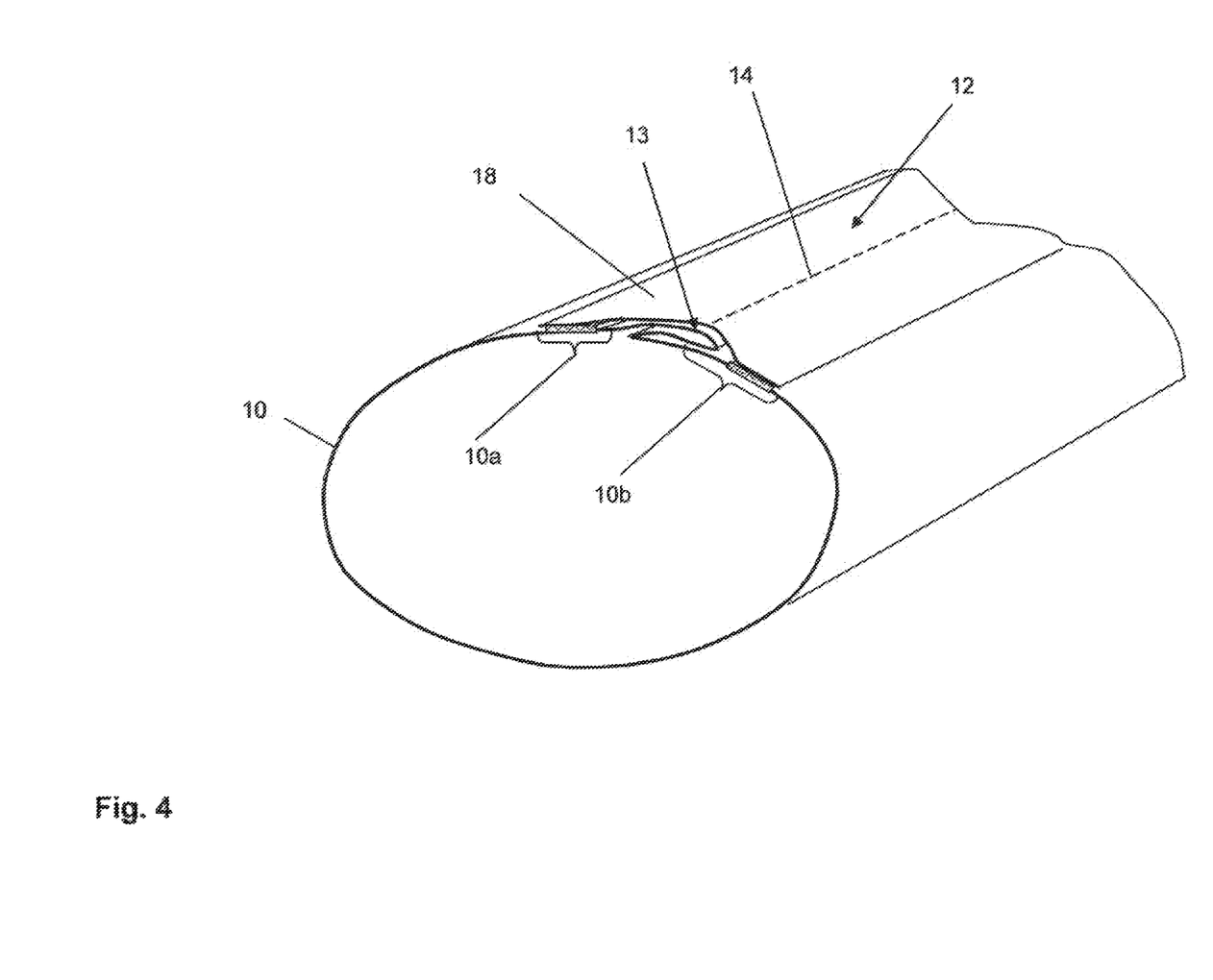
FIG. 4 shows a schematic partial representation of a further embodiment of a seamless inner film tube with a predetermined breaking point that is used in the lining tubes according to the invention and includes a film loop that is bridged by a film strip.

According to a further alternative embodiment of the invention, the inner film tube 10 may be a circumferentially seamless film tube, which has a circular cross section of a diameter which is more than 10%, preferably more than 40%, of the nominal diameter of the first shaft section 110, and which preferably corresponds to the diameter of the second, enlarged shaft section 120 of a sewer shaft 110 to be restored. In the case of this embodiment of the invention, shown in FIG. 4, to form a film loop 13 running in the circumferential direction of the inner film tube 10 and extending over the length of the inner film tube 10, the two outer circumferential portions 10a, 10b of the seamless film tube 10 arranged adjacent to one another are connected in the region of the connecting portion 12 by an adhesively attached or thermally welded-on transparent film strip 18, which spans and covers the film loop 13. Advantageously provided in this way is a connecting portion with a predetermined breaking point 14, which in FIG. 4 by way of example runs along the first and second circumferential portions 10a, 10b in the region of the adhesive point or weld seam, and which is schematically indicated by the dashed lines in FIG. 4. During the insertion and expansion of the inner film tube 10 of the embodiment from FIG. 4, it is immaterial whether the weld seam/adhesive point on the right or left in the representation is open during the expansion of the lining tube 1 in the widened second shaft section 120, since the circumferentially completely closed inner film tube 10 always ensures a closed-off volume of air inside the lining tube 1, which reliably prevents the reactive resin from being blown out during the expansion of the same.

In order in the case of a layer of fiber material 20 obtained by overlapping helical winding to ensure sufficiently great circumferential stretchability of the layer, it has at least one helically overlappingly wound fiber strip, in particular a glassfiber strip 22, the fiber material of which has a stretchability in the longitudinal direction of more than 10% with respect to the overall length of the strip. As has been found by the applicant, this great longitudinal stretching allows a correspondingly great radial expansion of the layer 20 produced from the helically overlappingly wound fiber strip by more than 10%, in particular more than 30%, up to 60%, without significant shrinkage in the longitudinal direction of the lining tube 1 occurring.

As can also be seen from the representation of FIG. 1, in the case of the previously described embodiments of lining tubes 1, preferably arranged on the layer of fiber material 20 is at least one longitudinal tension strip 30, which extends in the longitudinal direction of the lining tube 1. The longitudinal tension strip 30 preferably comprises continuous glass fibers or glassfiber rovings, which preferably run over the entire length of the lining tube and absorb the axial forces when the lining tube 1 is inserted into a defective sewer shaft 100 to be restored, for example by means of a crane.

Furthermore, in the case of the preferred embodiment of the lining tube 1, arranged around the layer of fiber material 20 is an outer film tube 40, which preferably has a diameter which is greater than or equal to the diameter of the further inner film tube/air bag 64, and preferably prevents a barrier against the escape of harmful substances, in particular styrene, from the reactive resin into the surrounding ground. The outer film tube 40 may also be surrounded by a further outer film tube 50, which consists of a reinforced material that is tension-resistant and impermeable to UV light, in particular of a fabric-reinforced plastic film which is provided with a circumferentially stretchable portion which, during the expansion of the lining tube, bursts in a way similar to the predetermined breaking point 14 as from a specified positive pressure, for example 0.2 bar, in the second shaft section 120 and allows radial stretching of the layer of fiber material 20.

According to a further concept on which the invention is based, a method for producing a previously described lining tube 1 is distinguished by the following method steps:

Firstly, a flat plastic film 16 permeable to UV light is formed into a circumferentially closed inner film tube 10 of a specified nominal diameter. This advantageously takes place by overlapping adhesive bonding or welding of the longitudinal edges 17*a*, 17*b* of the transparent flat plastic film 16 and/or by adhesively attaching or thermally welding a transparent film strip 18 onto two adjacent outer circumferential portions 10*a*, 10*b*, running parallel to one another, of the flat plastic film 16 arranged in the form of a tube. This has the effect of creating a connecting portion 12, which has a predetermined breaking point 14 running in the longitudinal direction of the inner film tube 10. On the outer side of the thus-formed inner film tube 10 with the predetermined breaking point 14, at least one circumferentially closed layer 20 of fiber material is arranged by overlapping laying or overlapping helical winding of at least one resin-impregnated fiber strip 22, in particular glassfiber strip. The winding preferably takes place here on a winding device, as is described for example in WO-A 95/04646.

In the case of a particularly advantageous embodiment of the method, a further transparent, circumferentially airtightly closed inner film tube 60, extending over the length of the lining tube 1, is laid in the flat plastic film 16 before the flat plastic film 16 is formed into the circumferentially closed inner film tube 10.

The lining tube 1 according to the invention produced in the way described above is subsequently transported to the construction site and installed there in a defective sewer shaft 100 to be restored, as is shown in the representations of FIGS. 2*a* to 2*e*.

This involves first one end of the lining tube 1 being fastened, for example by a tensioning belt that is not designated any more specifically, to a known cup-shaped packer 200, which is held above the sewer shaft 100 by a crane not shown any more specifically. As shown in FIG. 2*a*, the packer 200 with the lining tube 1 fastened to it is subsequently positioned in a vertical position above the sewer shaft 100, which has a first, upper shaft section 110 of a smaller diameter, for example 600 mm, and, lying thereunder, a second sewer section 120 of a greater diameter, for example 1000 mm.

Figure 2B:
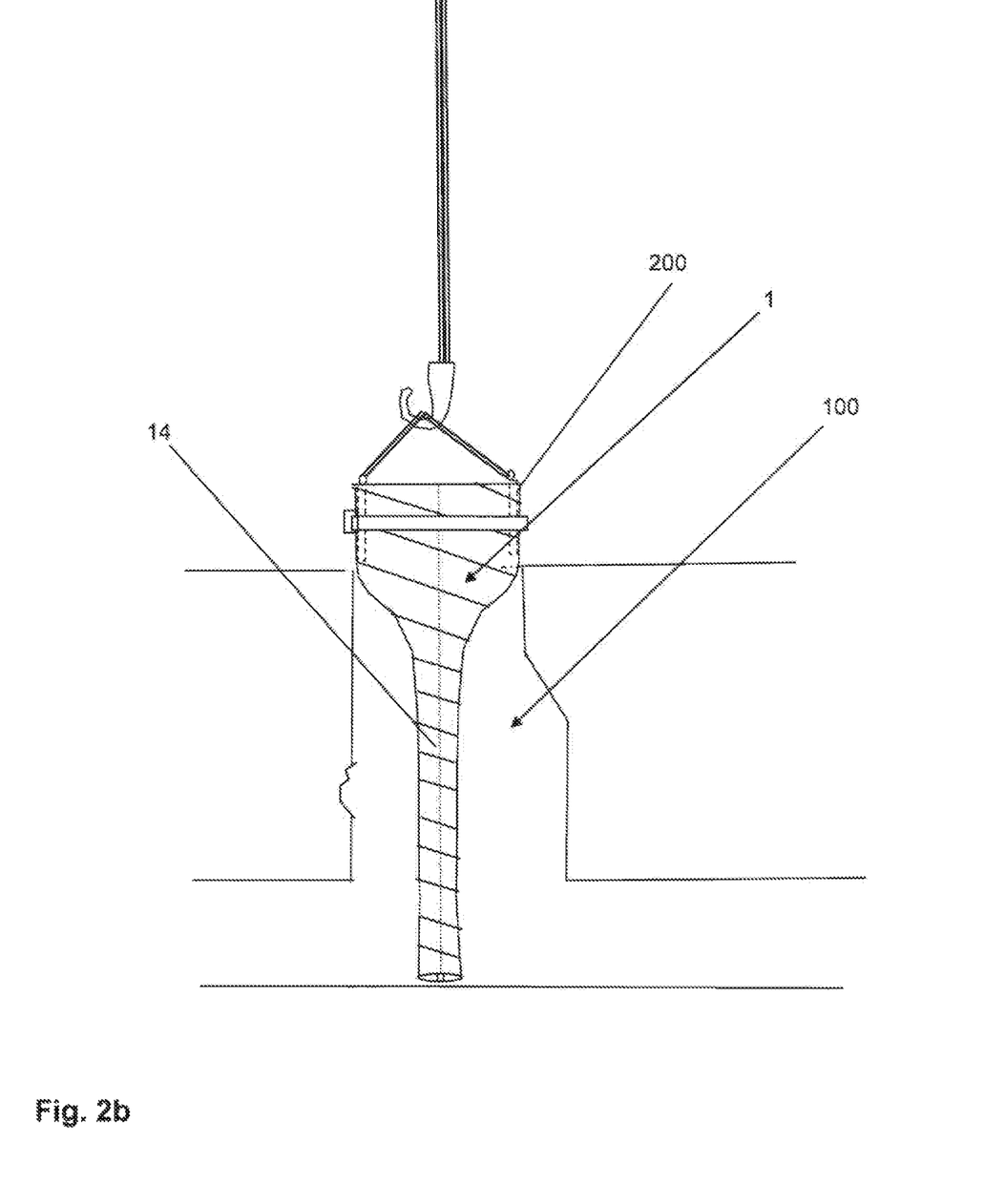
FIG. 2b shows the sewer shaft from FIG. 2a after the lowering of the lining tube.

Next, the packer 200 with the lining tube 1 fastened to it is lowered into the sewer shaft 100 until the lower end of the lining tube 1 rests on the bottom of the sewer shaft 100 (FIG. 2*b*).

Figure 2C:
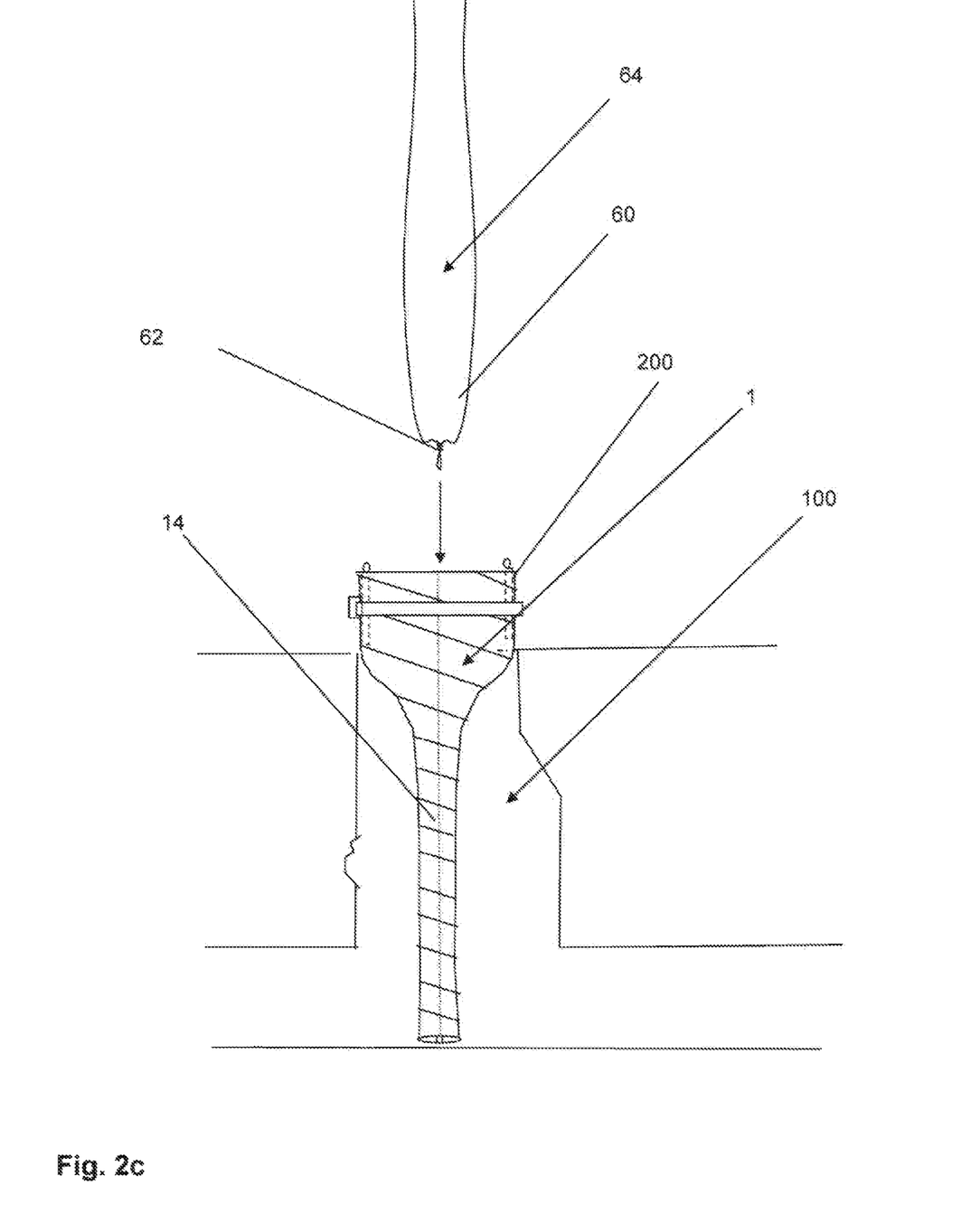
FIG. 2c shows the sewer shaft from FIG. 2a before the insertion of the further inner film tube into the lining tube.
Figure 2D:
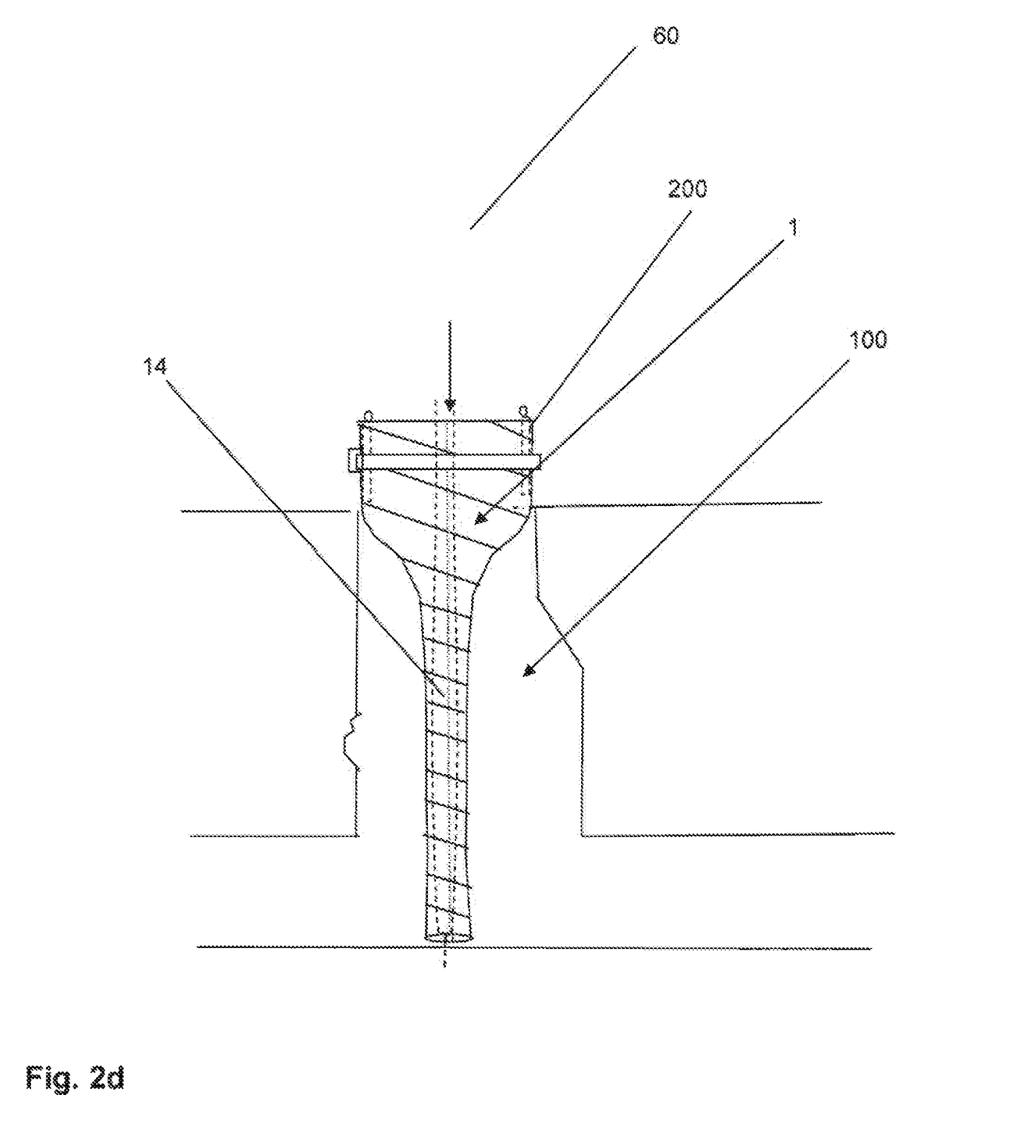
FIG. 2d shows the sewer shaft from FIG. 2a after the insertion of the further inner film tube.
Figure 2E:
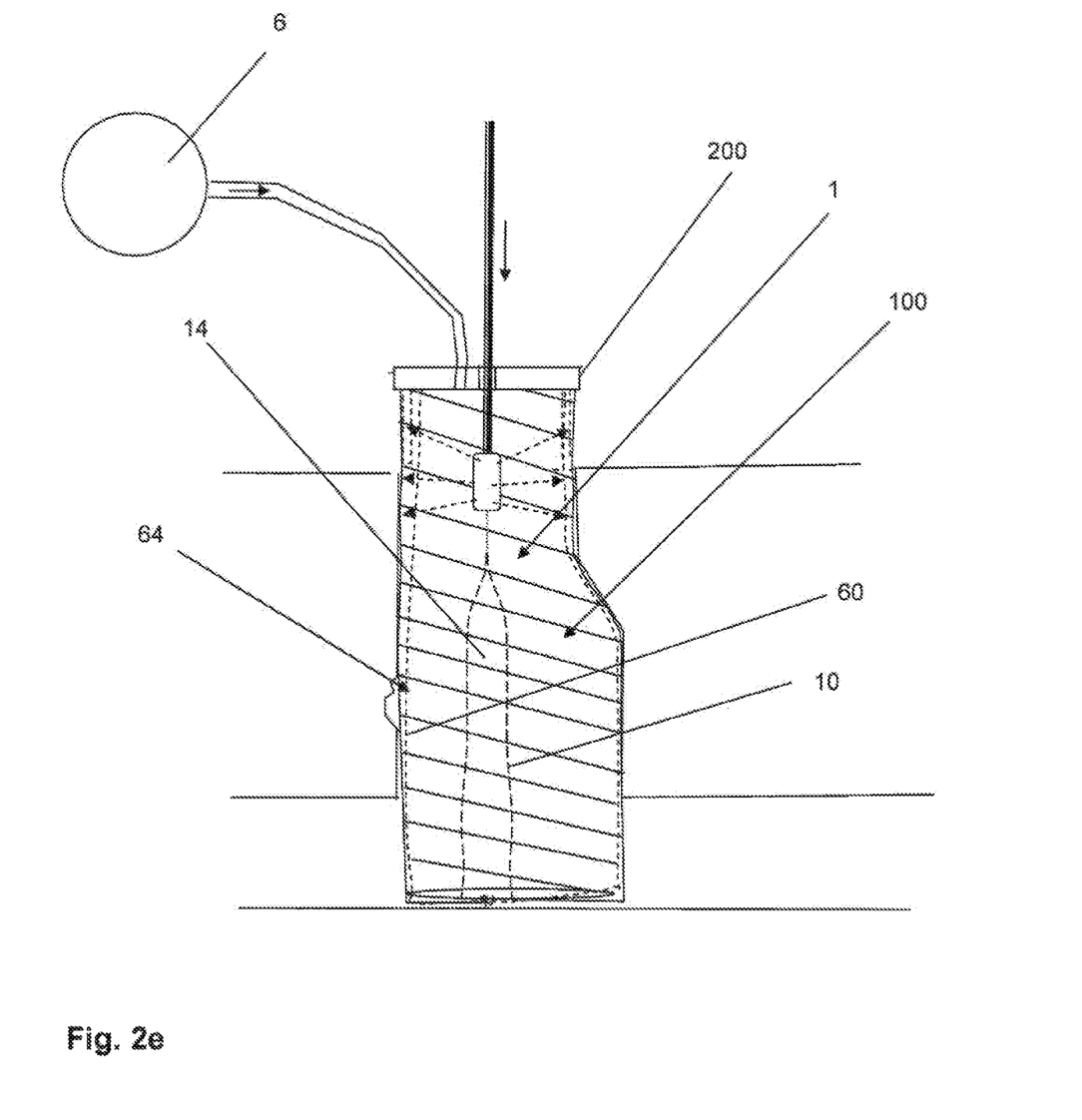
FIG. 2e shows the sewer shaft from FIG. 2a after the insertion of a radiation source and expansion of the lining tube and also irradiation of the inner side of the layer of fiber material laid against the inner wall of the shaft sections of different widths.

After that, a previously described further inner film tube 60, which has previously been closed at the bottom, for example by a sealing element 62 or by tying a knot and forms an air bag 64 closed on one side, is inserted from above into the inner film tube 10 of the lining tube 1, as is shown in FIGS. 2*c* and 2*d*.

In a final method step, the packer 200 is closed on its upper side in a known way by a cover, not designated any more specifically, and the interior space of the air bag 64 is subjected to positive pressure in a known way by introducing compressed air from a compressed air source 6 through the cover of the packer 200. As a result, in the region of the first sewer section 110 the inner film tube 10 comes to lie against the inner side of the layer of fiber material 20 and forces it against the inner side of the first shaft section 110, the inner film tube 10 being closed along the predetermined breaking point 14. In the adjoining conical transitional section and the second shaft section 120, in which the sewer shaft 100 has a greater diameter than the nominal diameter of the inner film tube 10, the predetermined breaking point 14 tears as a result of the increasing pressure and allows the further inner film tube/air bag 64 to come to lie against the inner side of the partially exposed layer of fiber material 20 and radially expands this layer and presses it against the inner wall of the second shaft section 120.

Finally, the reactive resin in the layer of fiber material 20 is cured by inserting a UV radiation source, not designated any more specifically, into the interior space of the air bag 64, while the fiber material is pressed against the inner wall of the sewer shaft 100 with high pressure due to the positive pressure in the further inner film tube 60/air bag 64.

LIST OF DESIGNATIONS

1 Lining tube
6 Compressed gas source
10 Inner film tube
10*a* First circumferential portion of the inner film tube
10*b* Second circumferential portion of the inner film tube
12 Connecting portion
13 Film loop
14 Predetermined breaking point
16 Flat film formed into a tube
16*a* Edge portion
16*b* Edge portion
17*a* Longitudinal edge
17*b* Longitudinal edge
18 Welded-on film strip
20 Layer of fiber material
22 Fiber strip
30 Longitudinal tension strip
40 Outer film tube
50 Further outer film tube of reinforced tension-resistant material
60 Further inner film tube 62 Sealing element/cord
64 Air bag
100 Sewer shaft
110 First shaft section
120 Second shaft section
200 Packer

The invention claimed is:

1. A lining tube for restoring a defective sewer shaft, wherein the sewer shaft has a first shaft section with a first diameter and, adjoining the first shaft section, a second shaft section with a widened diameter, the lining tube comprising:
   an inner film tube having a connecting portion, which extends in a longitudinal direction thereof and connects two circumferential portions of said inner film tube running parallel to one another to form a circumferentially closed inner film tube having a defined nominal diameter;
   a radially expandable layer of fiber material arranged around said inner film tube, said layer of fiber material being impregnated with a curable reactive resin; and
   a further film tube of an airtight transparent plastics material arranged inside said inner film tube, said further film tube extending in the longitudinal direction of the lining tube over an entire length thereof, and a sealing element closing off one end of said further film tube with an airtight seal to form an air bag that is closed on one side;
   said connecting portion of said inner film tube having a predetermined breaking point, which extends along said inner film tube and is formed to be broken open in the circumferential direction by introducing into said further film tube a pressure medium for radially expanding said inner film tube and said layer of fiber material arranged thereon beyond the nominal diameter.

2. The lining tube according to claim 1, wherein said inner film tube comprises at least one flat film, which is formed into a tube and which has longitudinal edges running at a distance from one another and being connected by a transparent film strip adhesively attached or thermally welded onto an outer side or inner side thereof.

3. The lining tube according to claim 1, wherein said inner film tube comprises at least one flat film, which is formed into a tube and which has edge portions that are connected by a transparent adhesive tape or guided to overlap one another and connected to one another by a device selected from the group consisting of adhesive, a transparent double-sided adhesive tape, and thermal welding.

4. The lining tube according to claim 1, wherein said inner film tube is a circumferentially seamless film tube, which has a circular cross section of a diameter which is more than 10% of the nominal diameter, and wherein, to form a film loop running in the circumferential direction of said inner film tube and extending over a length of said inner film tube, two outer circumferential portions of the seamless film tube arranged parallel to one another are connected to one another in a region of said connecting portion by an adhesively attached or thermally welded-on transparent film strip, which spans said film loop.

5. The lining tube according to claim 4, wherein the diameter of said circumferentially seamless film tube is more than 40% of the nominal diameter of the circumferentially closed inner film tube.

6. The lining tube according to claim 1, wherein:
   said layer of fiber material comprises at least one helically overlappingly wound fiber strip or at least one fiber strip extending in the longitudinal direction of the lining tube and laid with overlapping longitudinal edges thereof;
   the fiber material of said tubular layer has a stretchability of more than 10% in such a way that, by introducing the pressure medium into the interior space of the lining tube, said tubular layer of fiber material is enlarged radially from a first diameter to a second diameter, with a size of the second diameter exceeding a size of the first diameter by at least 10%.

7. The lining tube according to claim 6, wherein the second diameter exceeds the first diameter by at least 30%.

8. The lining tube according to claim 1, which comprises a longitudinal tension strip arranged on said layer of fiber material, said longitudinal tension strip extending in the longitudinal direction of the lining tube and containing at least one of glass fibers or glass fiber rovings running in the longitudinal direction of the lining tube for absorbing and transmitting axial forces during a drawing of the lining tube into a sewer shaft, and/or an outer film tube arranged around said layer of fiber material.

9. The lining tube according to claim 8, which comprises an optional further outer film tube, which is impermeable to UV light and is formed of a reinforced tension-resistant material for absorbing axial tensile forces.

10. The lining tube according to claim 9, wherein said further outer film tube is a fabric-reinforced plastic film.

11. The lining tube according to claim 1, wherein said sealing element is a knot or a cord wound around the outer side of said further film tube or a cable tie.

12. A method for producing the lining tube according to claim 1, the method comprising:
   providing a transparent flat plastic film having longitudinal edges;
   forming the plastic film into a circumferentially closed inner film tube of a specified nominal diameter by overlapping adhesive bonding or welding of the longitudinal edges and/or by adhesively attaching or thermally welding a transparent film strip onto two adjacent outer circumferential portions, running parallel to one another, of the flat plastic film arranged in the form of a tube, thereby creating a connecting portion, which has a predetermined breaking point running in the longitudinal direction of the inner film tube;
   arranging a further film tube of an airtight transparent plastics material inside the inner film tube, the further film tube extending in the longitudinal direction of the lining tube over an entire length thereof, and closing off one end of the further film tube with an airtight seal to form an air bag that is closed on one side; and
   arranging a layer of fiber material on the outer side of the circumferentially closed tubular inner film tube by overlapping helical winding or overlapping laying of at least one resin-impregnated fiber strip around the inner film tube.

13. The method according to claim 12, wherein the at least one resin-impregnated fiber strip is a glassfiber strip.

14. The method according to claim 12, which comprises laying the further film tube forming the air bag onto the plastic film before the plastic film is formed into the circumferentially closed inner film tube.

15. A method of lining a defective sewer shaft, which has a first shaft section of a first diameter and, adjoining the first shaft section, a second shaft section of a widened diameter, the method comprising:
   providing a lining tube according to claim 1;

fastening one end of the lining tube to a cup-shaped packer;
raising the packer with the lining tube fastened thereto into a position vertically above the sewer shaft;
lowering the packer with the lining tube fastened thereto into the sewer shaft;
expanding the air bag, which has been closed in an airtight manner in the region of the bottom of the sewer shaft, by introducing a pressure medium into the air bag in such a way that, with the predetermined breaking point in the connecting portion breaking open, the lining tube expands radially inside the sewer shaft and comes to lie against the inner wall of the widened second sewer section; and
curing the reactive resin in the layer of fiber material by introducing a radiation source into an interior space of the expanded air bag arranged in the lining tube.

16. The method according to claim 15, wherein the pressure medium is pressurized air.

\* \* \* \* \*